(12) United States Patent
Lin et al.

(10) Patent No.: US 11,652,420 B2
(45) Date of Patent: *May 16, 2023

(54) ISOLATED CONVERTER WITH HIGH BOOST RATIO

(71) Applicant: DELTA ELECTRONICS, INC., Taoyuan (TW)

(72) Inventors: Hung-Chieh Lin, Taoyuan (TW); Chao-Li Kao, Taoyuan (TW); Yi-Ping Hsieh, Taoyuan (TW); Jin-Zhong Huang, Taoyuan (TW); Chao-Lung Kuo, Taoyuan (TW); Hung-Yu Huang, Taoyuan (TW); Chih-Hsien Li, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,608

(22) Filed: Jul. 1, 2021

(65) Prior Publication Data

US 2021/0336548 A1    Oct. 28, 2021

Related U.S. Application Data

(63) Continuation of application No. 16/867,242, filed on May 5, 2020, now Pat. No. 11,088,629.

(Continued)

(30) Foreign Application Priority Data

Apr. 1, 2020    (CN) .......................... 202010248753.X (51) Int. Cl.
*H02M 3/335*    (2006.01)
(Continued)

(52) U.S. Cl.
CPC ... *H02M 3/33592* (2013.01); *H02M 3/33553* (2013.01); *H02M 3/33584* (2013.01)

(58) Field of Classification Search
CPC ........ H02M 7/066; H02M 7/103; H02M 7/10; H02M 7/219; H02M 7/19; H02M 7/25; H02M 2007/2195
See application file for complete search history.

(56) References Cited

U.S. PATENT DOCUMENTS 3,478,258 A * 11/1969 Nagai ..................... H02M 3/07
                                                                   307/110
3,579,078 A *  5/1971 Cronin .............. H02M 3/33573
                                                                    363/60

(Continued)

FOREIGN PATENT DOCUMENTS

CN        103887987 A  *  6/2014  ............ H02M 3/335

*Primary Examiner* — Yusef A Ahmed
(74) *Attorney, Agent, or Firm* — Chun-Ming Shih; HDLS IPR Services (57) ABSTRACT

An isolated converter with high boost ration includes a transformer, a first bridge arm, a second bridge arm, and a boost circuit. The transformer includes a secondary side having a secondary side first node and a secondary side second node. The first bridge arm includes a first diode and a second diode. The second bridge arm includes a third diode and a fourth diode. The boost circuit includes at least one fifth diode coupled between the first bridge arm and the secondary side second node, at least one sixth diode coupled between the second bridge arm and the secondary side first node, and at least two capacitors coupled to the secondary side first node and the secondary side second node.

5 Claims, 13 Drawing Sheets

Related U.S. Application Data (60) Provisional application No. 62/860,650, filed on Jun. 12, 2019.

(56) References Cited

U.S. PATENT DOCUMENTS

| | | | | |
|---|---|---|---|---|
| 4,167,777 A * | 9/1979 | Allington | H02M 7/10 | 363/79 |
| 4,454,455 A * | 6/1984 | Matulevich | H02M 7/19 | 318/94 |
| 4,559,590 A * | 12/1985 | Davidson | H02M 3/01 | 363/133 |
| 4,660,134 A * | 4/1987 | Geray | H02M 7/10 | 363/20 |
| 4,675,795 A * | 6/1987 | Takamura | H02M 7/103 | 363/61 |
| 4,839,786 A * | 6/1989 | Ohosuga | H02M 7/10 | 361/111 |
| 5,663,877 A * | 9/1997 | Dittli | H02M 3/33592 | 363/21.06 |
| 5,774,346 A * | 6/1998 | Poon | H02M 3/33573 | 323/224 |
| 5,856,916 A * | 1/1999 | Bonnet | H02M 7/103 | 363/20 |
| 5,883,795 A * | 3/1999 | Farrington | H02M 3/33538 | 363/21.04 |
| 5,956,243 A * | 9/1999 | Mao | H02M 1/4208 | 363/61 |
| 6,067,236 A * | 5/2000 | White | H02M 3/3374 | 363/16 |
| 6,154,382 A * | 11/2000 | Kawahara | H02M 7/103 | 363/68 |
| 6,272,031 B1 * | 8/2001 | Shona | H02M 7/103 | 363/61 |
| 8,009,444 B2 * | 8/2011 | Duan | H02M 3/33569 | 363/21.04 |
| 8,238,129 B2 * | 8/2012 | Unkrich | H02M 7/064 | 363/125 |
| 8,498,136 B2 * | 7/2013 | Shinomoto | H02M 1/4208 | 363/125 |
| 8,885,366 B2 * | 11/2014 | Yu | H02M 3/33576 | 363/24 |
| 9,356,522 B2 * | 5/2016 | Hong | H05B 47/10 | |
| 9,692,313 B1 * | 6/2017 | Isurin | H02M 3/28 | |
| 9,997,994 B1 * | 6/2018 | Luo | H02M 3/33546 | |
| 10,483,862 B1 * | 11/2019 | Cook | H02M 1/088 | |
| 10,491,136 B2 * | 11/2019 | Lyasu | H02M 7/219 | |
| 10,700,614 B1 * | 6/2020 | Wang | H02M 1/34 | |
| 10,819,244 B1 * | 10/2020 | Shi | H02M 3/33573 | |
| 2004/0047165 A1 * | 3/2004 | Luo | H02M 7/538 | 363/25 |
| 2004/0264224 A1 * | 12/2004 | Jang | H02M 1/34 | 363/97 |
| 2008/0316775 A1 * | 12/2008 | Tsai | H02M 7/217 | 363/21.01 |
| 2009/0213625 A1 * | 8/2009 | Adler | H02M 7/10 | 363/65 |
| 2009/0219006 A1 * | 9/2009 | Gekinozu | H02M 3/1582 | 323/304 |
| 2011/0013436 A1 * | 1/2011 | Gan | H02M 1/4225 | 363/126 |
| 2011/0199802 A1 * | 8/2011 | Leu | H02M 1/34 | 363/131 |
| 2011/0242853 A1 * | 10/2011 | Agarwal | H02M 7/103 | 363/16 |
| 2012/0250359 A1 * | 10/2012 | Knill | H02J 3/381 | 363/17 |
| 2012/0250373 A1 * | 10/2012 | Adam | H02J 3/381 | 363/37 |
| 2012/0287678 A1 * | 11/2012 | Xu | H02M 3/158 | 363/21.02 |
| 2012/0294053 A1 * | 11/2012 | Yan | H02M 1/4208 | 363/53 |
| 2013/0003427 A1 * | 1/2013 | Pan | H02M 1/4208 | 363/44 |
| 2013/0257392 A1 * | 10/2013 | Yan | H02M 1/0085 | 323/210 |
| 2013/0322136 A1 * | 12/2013 | Ceu | H02M 7/53873 | 363/40 |
| 2014/0104893 A1 * | 4/2014 | Pan | H02M 3/01 | 363/21.02 |
| 2014/0354247 A1 * | 12/2014 | Xu | H02M 1/0085 | 323/207 |
| 2015/0016164 A1 * | 1/2015 | Takajou | H02M 3/156 | 399/88 |
| 2015/0078053 A1 * | 3/2015 | Harrison | H02M 7/4807 | 363/132 |
| 2015/0102765 A1 * | 4/2015 | Lee | H02M 3/33573 | 363/17 |
| 2015/0131330 A1 * | 5/2015 | Pan | H02M 3/33584 | 363/17 |
| 2015/0207424 A1 * | 7/2015 | Okamoto | H02M 1/12 | 363/17 |
| 2015/0330195 A1 * | 11/2015 | Dong | H03K 17/691 | 307/31 |
| 2016/0036338 A1 * | 2/2016 | El-Barbari | H02M 3/33576 | 363/17 |
| 2016/0087545 A1 * | 3/2016 | Higaki | H02M 3/33584 | 363/17 |
| 2016/0118817 A1 * | 4/2016 | Uno | H02M 3/156 | 320/166 |
| 2016/0190933 A1 * | 6/2016 | Lee | H02M 3/33507 | 363/17 |
| 2016/0233406 A1 * | 8/2016 | Kurikuma | H02N 2/181 | |
| 2016/0276941 A1 * | 9/2016 | Iwaya | H02M 3/3376 | |
| 2016/0307086 A1 * | 10/2016 | Nozoe | H02M 1/32 | |
| 2017/0126136 A1 * | 5/2017 | Nakahori | H02M 3/33507 | |
| 2017/0222562 A1 * | 8/2017 | Nakahori | H02M 3/33507 | |
| 2017/0237339 A1 * | 8/2017 | Young | H02M 1/4225 | 363/126 |
| 2017/0353111 A1 * | 12/2017 | Elasser | H02M 3/33571 | |
| 2017/0373592 A1 * | 12/2017 | Takahashi | H02M 3/07 | |
| 2018/0175732 A1 * | 6/2018 | Dai | H02M 3/3376 | |
| 2018/0287504 A1 * | 10/2018 | Parsekar | H02M 7/487 | |
| 2018/0335714 A1 * | 11/2018 | Hirabayashi | H02M 3/156 | |
| 2019/0341855 A1 * | 11/2019 | Kim | H02M 7/219 | |
| 2020/0083814 A1 * | 3/2020 | Choi | H02M 3/158 | |
| 2020/0220368 A1 * | 7/2020 | Fei | H02M 3/3376 | |
| 2020/0287461 A1 * | 9/2020 | Zou | H02M 3/158 | |
| 2020/0358355 A1 * | 11/2020 | Zambetti | H03K 17/693 | |
| 2020/0395861 A1 * | 12/2020 | Lin | H02M 3/33553 | |
| 2021/0044210 A1 * | 2/2021 | Huang | H02M 1/12 | |

* cited by examiner

ISOLATED CONVERTER WITH HIGH BOOST RATIO

CROSS-REFERENCE TO RELATED APPLICATION

This patent application is a continuing application of U.S. patent application Ser. No. 16/867,242 filed on May 5, 2020, and entitled "ISOLATED CONVERTER WITH HIGH BOOST RATIO," which claims the benefit of United States Provisional Patent Application No. 62/860,650 filed Jun. 12, 2019, and claims priority of CN202010248753.X filed Apr. 1, 2020. The entire disclosures of the above applications are all incorporated herein by reference.

BACKGROUND

Technical Field

The present disclosure relates to an isolated converter, and more particularly to an isolated converter with high boost ratio.

Description of Related Art

The statements in this section merely provide background information related to the present disclosure and do not necessarily constitute prior art.

Figure 1:
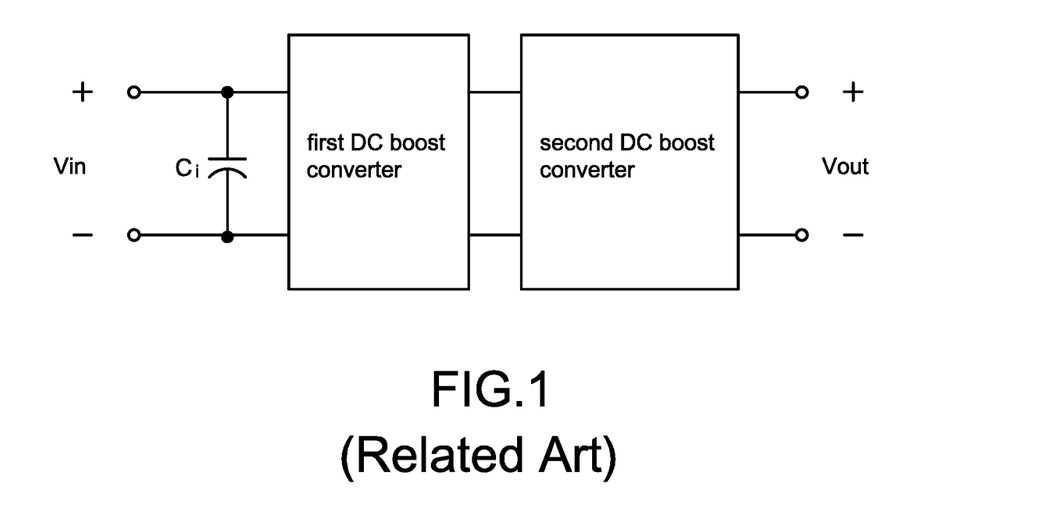
FIG. 1 is a circuit block diagram of a conventional non-isolated boost converter.

Please refer to FIG. 1, which shows a circuit block diagram of a conventional non-isolated boost converter. If a high voltage conversion ratio (boost ratio) is required, for example more than 10 times, two or more than two boost (DC-to-DC) converters are used to implement the requirement of high boost ratio. As shown in FIG. 1, a first DC boost converter and a second DC boost converter are used. However, disadvantages of the multi-stage boost converters are higher circuit component costs and lower conversion efficiency.

Figure 2:
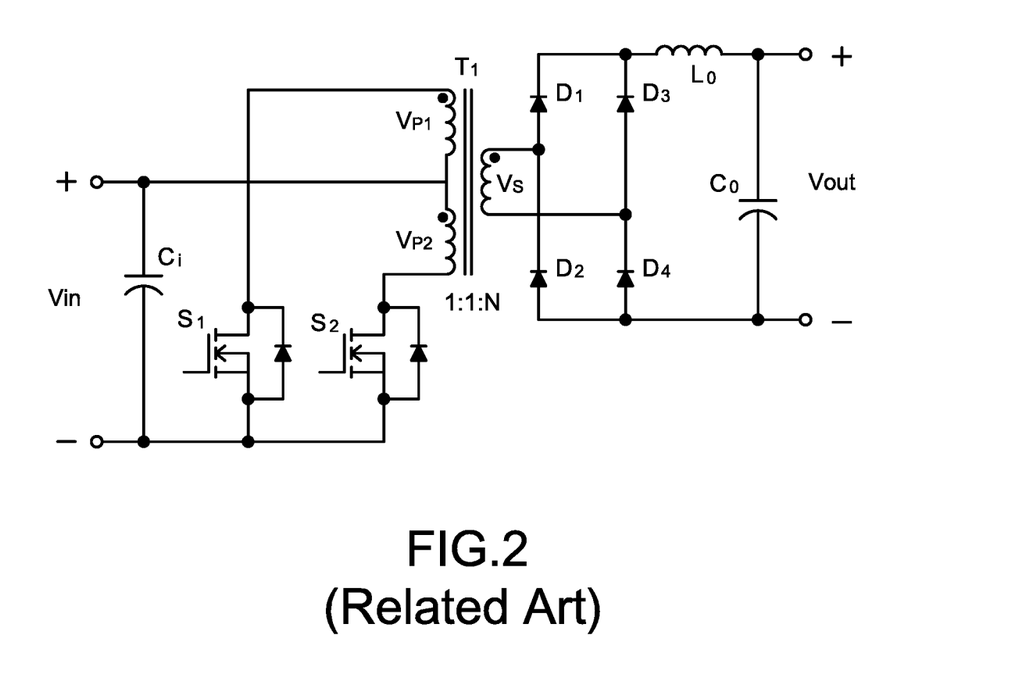
FIG. 2 is a circuit diagram of a conventional push-pull converter.

Please refer to FIG. 2, which shows a circuit diagram of a conventional push-pull converter. The push-pull converter has an advantage of electrical isolation by an isolated transformer. By adjusting the number of coil turns of the isolated transformer, the high boost ratio (voltage conversion ratio) of the push-pull converter can be implemented. If the voltage conversion ratio is too high, however, excessive number of the secondary-side coil turns causes an increase in the leakage inductance of the isolated transformer, resulting in higher stress on the switch and/or the diode, and therefore the components with higher rated voltage need to be used. Further, the turned-on resistance of the switch becomes larger cause increased circuit costs, reduced efficiency, and larger transformer volume.

Figure 3:
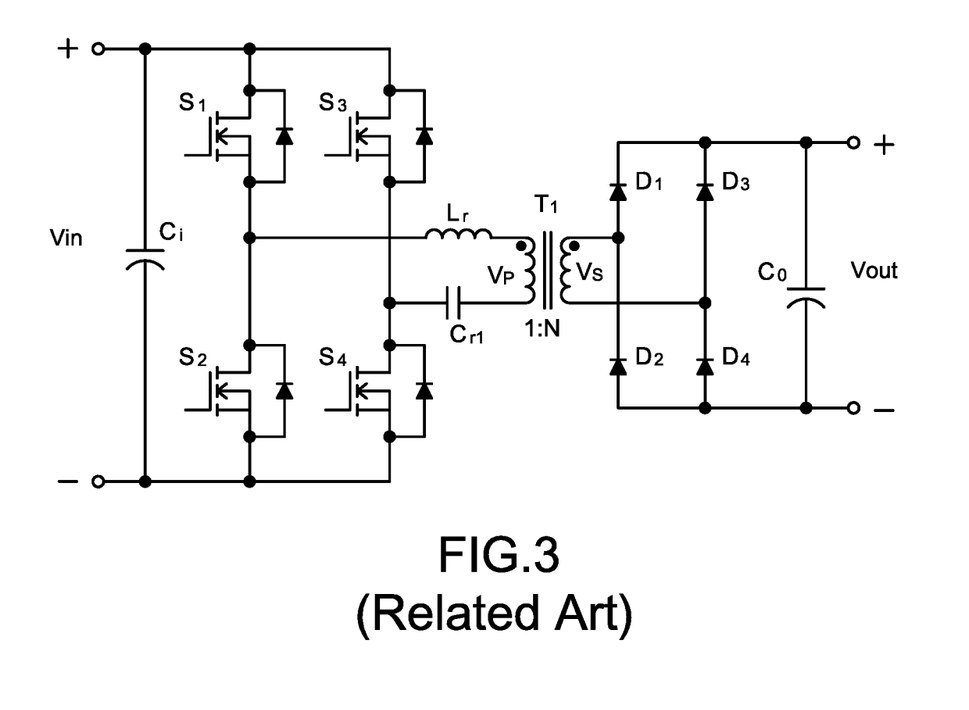
FIG. 3 is a circuit diagram of a conventional full-bridge LLC resonant converter.

Please refer to FIG. 3, which shows a circuit diagram of a conventional full-bridge LLC resonant converter. The switches of the LLC resonant converter can operate under ZVS (zero voltage switching) condition, and usually the switching frequency is designed near the resonance point. By adjusting the number of coil turns of the isolated transformer, the high voltage conversion ratio of the LLC resonant converter can be implemented. If the voltage conversion ratio is too high, however, excessive number of the coil turns causes the increased coil turns of the transformer, increased volume of the transformer, and reduced efficiency. Moreover, the full-bridge LLC resonant converter shown in FIG. 3 provides the first- and third-quadrant operations of the transformers. The quadrant here refers to the main operation area of the transformer in the B-H curve (hysteresis phenomenon is ignored).

Figure 4:
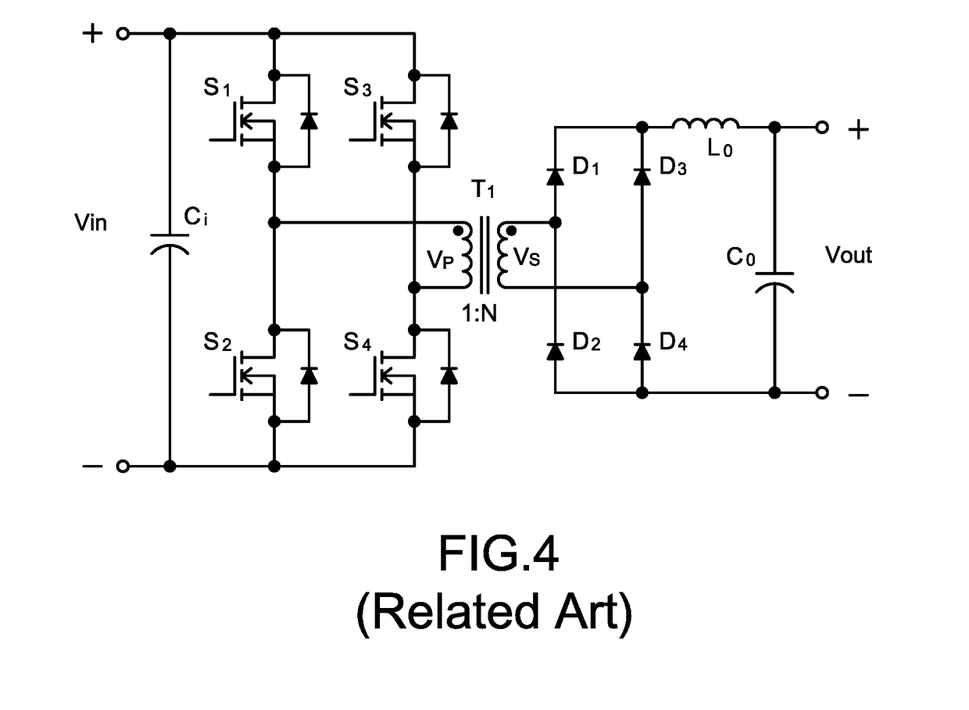
FIG. 4 is a circuit diagram of a conventional full-bridge phase-shift converter.

Please refer to FIG. 4, which shows a circuit diagram of a conventional full-bridge phase-shift converter. The switches of the full-bridge converter can operate under ZVS condition by phase control techniques. In comparison with the push-pull converter, the full-bridge converter has fewer switching losses. By adjusting the number of coil turns of the isolated transformer, the required output voltage of the full-bridge converter can be implemented. In order to implement the high boost ratio (voltage conversion ratio), however, the excessive number of the coil turns causes larger transformer volume, higher stress of the semiconductor switch, and lower conversion efficiency.

In the above several common isolated converters, the isolated transformer thereof operates in the first quadrant and the third quadrant. The present disclosure proposes an isolated converter with high boost ratio that can operate in the first quadrant and the third quadrant. The high boost ratio of the isolated converter can be implemented by charging capacitors to establish a high output voltage, thereby effectively reducing the number of coil turns of the isolated transformer. Accordingly, it is to increase efficiency of the boost circuit, reduce circuit component costs, and reduce occupied volume due to the reduction of the number of coil turns of the isolated transformer.

SUMMARY

An object of the present disclosure is to provide an isolated converter with high boost ratio to solve the above-mentioned problems.

In order to achieve the above-mentioned object, the isolated converter with high boost ratio includes a transformer, a first bridge arm, a second bridge arm, and a boost circuit. The transformer includes a secondary side having a secondary side first node and a secondary side second node. The first bridge arm has a first diode and a second diode. A cathode of the first diode is coupled to a DC positive output node, an anode of the first diode is coupled to a first bridge arm upper node. An anode of the second diode is coupled to a DC negative output node, and a cathode of the second diode is coupled to a first bridge arm lower node. The second bridge arm has a third diode and a fourth diode. A cathode of the third diode is coupled to the DC positive output node, an anode of the third diode is coupled to a second bridge arm upper node. An anode of the fourth diode is coupled to the DC negative output node, and a cathode of the fourth diode is coupled to a second bridge arm lower node. The boost circuit includes at least one fifth diode, at least one sixth diode, and at least two capacitors. The at least one fifth diode is coupled between the first bridge arm and the secondary side second node. The at least one sixth diode is coupled between the second bridge arm and the secondary side first node. The at least two capacitors are coupled to the secondary side first node and the secondary side second node.

Accordingly, the isolated converter with high boost ratio is provided to increase efficiency of the boost circuit, reduce circuit component costs, and reduce occupied volume due to the reduction of the number of coil turns of the isolated transformer.

Another object of the present disclosure is to provide an isolated converter with high boost ratio to solve the above-mentioned problems.

In order to achieve the above-mentioned object, the isolated converter with high boost ratio includes a transformer, a first bridge arm, a second bridge arm, and a boost circuit. The transformer includes a secondary side having a secondary side first node and a secondary side second node. The first bridge arm has a first switch and a second switch. A first end of the first switch is coupled to a DC positive output node, a second end of the first switch is coupled to a first bridge arm upper node, a first end of the second switch is coupled to a DC negative output node, and a second end of the second switch is coupled to a first bridge arm lower node. The second bridge arm has a third switch and a fourth switch. A first end of the third switch is coupled to the DC positive output node, a second end of the third switch is coupled to a second bridge arm upper node, a first end of the fourth switch is coupled to the DC negative output node, and a second end of the fourth switch is coupled to a second bridge arm lower node. The boost circuit includes at least one fifth switch, at least one sixth switch, and at least two capacitors. The at least one fifth switch is coupled between the first bridge arm and the secondary side second node. The at least one sixth switch is coupled between the second bridge arm and the secondary side first node. The at least two capacitors are coupled to the secondary side first node and the secondary side second node.

Accordingly, the isolated converter with high boost ratio is provided to increase efficiency of the boost circuit, reduce circuit component costs, and reduce occupied volume due to the reduction of the number of coil turns of the isolated transformer.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 5:
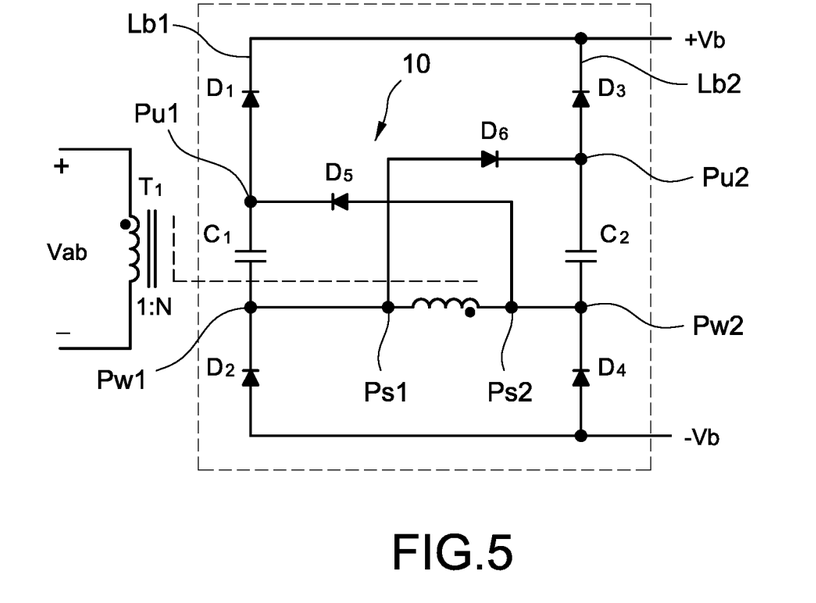
FIG. 5 is a single-bus circuit structure of an isolated converter with high boost ratio according to a first embodiment of the present disclosure.

Please refer to FIG. 5, which shows a single-bus circuit structure of an isolated converter with high boost ratio according to a first embodiment of the present disclosure. The isolated converter includes a transformer T1, a first bridge arm Lb1, a second bridge arm Lb2, and a boost circuit 10. The transformer T1 includes a secondary side having a secondary side first node Ps1 and a secondary side second node Ps2. The first bridge arm Lb1 includes a first diode D1 and a second diode D2. A cathode of the first diode D1 is coupled to a DC positive output node+Vb, an anode of the first diode D1 is coupled to a first bridge arm upper node Pu1, an anode of the second diode D2 is coupled to a DC negative output node −Vb, and a cathode of the second diode D2 is coupled to a first bridge arm lower node Pw1. The second bridge arm Lb2 includes a third diode D3 and a fourth diode D4. A cathode of the third diode D3 is coupled to the DC positive output node+Vb, an anode of the third diode D3 is coupled to a second bridge arm upper node Pu2, an anode of the fourth diode D4 is coupled to the DC negative output node −Vb, and a cathode of the fourth diode D4 is coupled to a second bridge arm lower node Pw2.

The boost circuit 10 includes at least one fifth diode D5, at least one sixth diode D6, and at least two capacitors. The at least one fifth diode D5 is coupled between the first bridge arm Lb1 and the secondary side second node Ps2. The at least one sixth diode D6 is coupled between the second bridge arm Lb2 and the secondary side first node Ps1. The at least two capacitors are coupled to the secondary side first node Ps1 and the secondary side second node Ps2.

As shown in FIG. 5, the number of the at least two capacitors is two, including a first capacitor C1 and a second capacitor C2. Two ends of the first capacitor C1 are coupled to the secondary side first node Ps1 and the first bridge arm upper node Pu1, and two ends of the second capacitor C2 are coupled to the secondary side second node Ps2 and the second bridge arm upper node Pu2. A cathode of the fifth diode D5 is coupled to the first bridge arm upper node Pu1, and an anode of the fifth diode D5 is coupled to the secondary side second node Ps2; a cathode of the sixth diode D6 is coupled to the second bridge arm upper node Pu2, and an anode of the sixth diode D6 is coupled to the secondary side first node Ps1.

Figure 6:
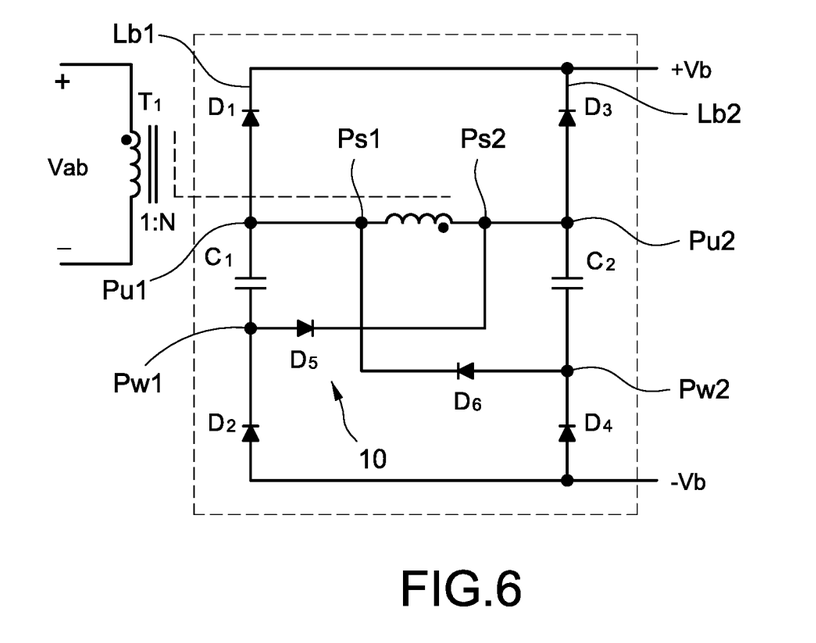
FIG. 6 is a single-bus circuit structure of the isolated converter with high boost ratio according to a second embodiment of the present disclosure.

As shown in FIG. 6, the number of the at least two capacitors is two, including a first capacitor C1 and a second capacitor C2. Two ends of the first capacitor C1 are coupled to the secondary side first node Ps1 and the first bridge arm lower node Pw1, and two ends of the second capacitor C2 are coupled to the secondary side second node Ps2 and the second bridge arm lower node Pw2. An anode of the fifth diode D5 is coupled to the first bridge arm lower node Pw1, and a cathode of the fifth diode D5 is coupled to the secondary side second node Ps2; an anode of the sixth diode D6 is coupled to the second bridge arm lower node Pw2, and a cathode of the sixth diode D6 is coupled to the secondary side first node Ps1.

The diode-capacitor circuit, which is coupled to the secondary side of the transformer T1, is proposed to charge the capacitors through the secondary side coil turns, thereby reducing coil turns, increasing conversion efficiency, and reducing occupied volume. Further, the diode-capacitor circuit can be used in a variety of isolated converters capable of operating both in a first quadrant and a third quadrant.

Figure 7:
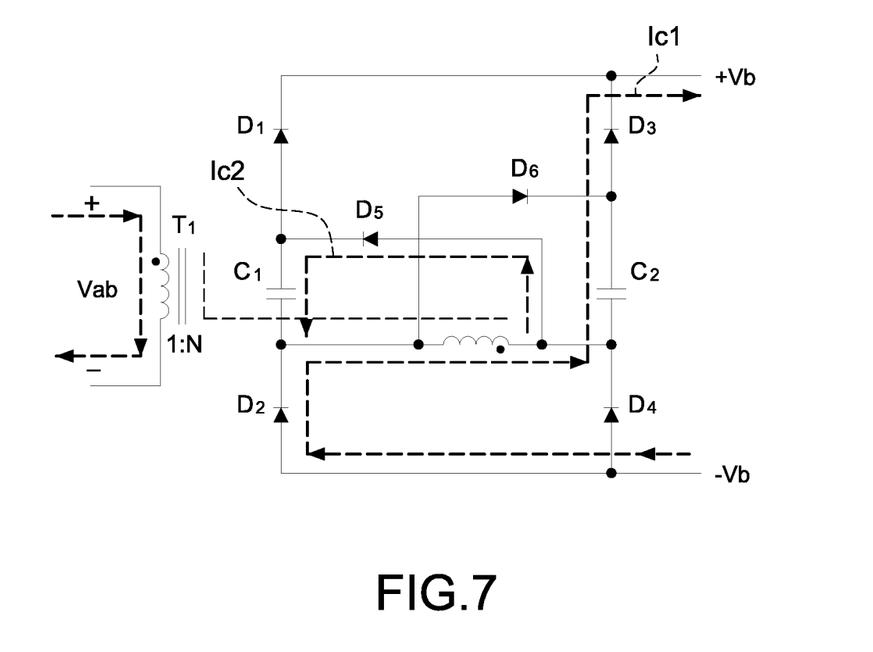
FIG. 7 is a schematic diagram of current paths of a first-quadrant operation in FIG. 5.

Please refer to FIG. 7, which shows a schematic diagram of current paths of a first-quadrant operation in FIG. 5. When the isolated converter operates in a first quadrant, a main current Ic1 flows through the secondary side of the transformer T1, the second capacitor C2, the third diode D3, the DC positive output node+Vb, the DC negative output node −Vb, the second diode D2, and the secondary side. A pre-charge current Ic2 flows through the secondary side of the transformer T1, the fifth diode D5, the first capacitor C1, and the secondary side. In particular, the first capacitor C1 is charged by the pre-charge current Ic2.

In addition, when the isolated converter shown in FIG. 6 operates in a first quadrant (not shown), a main current flows through the secondary side of the transformer T1, the third diode D3, the DC positive output node+Vb, the DC negative output node −Vb, the second diode D2, the first capacitor C1, and the secondary side. A pre-charge current flows through the secondary side of the transformer T1, the second capacitor C2, the sixth diode D6, and the secondary side.

Figure 8:
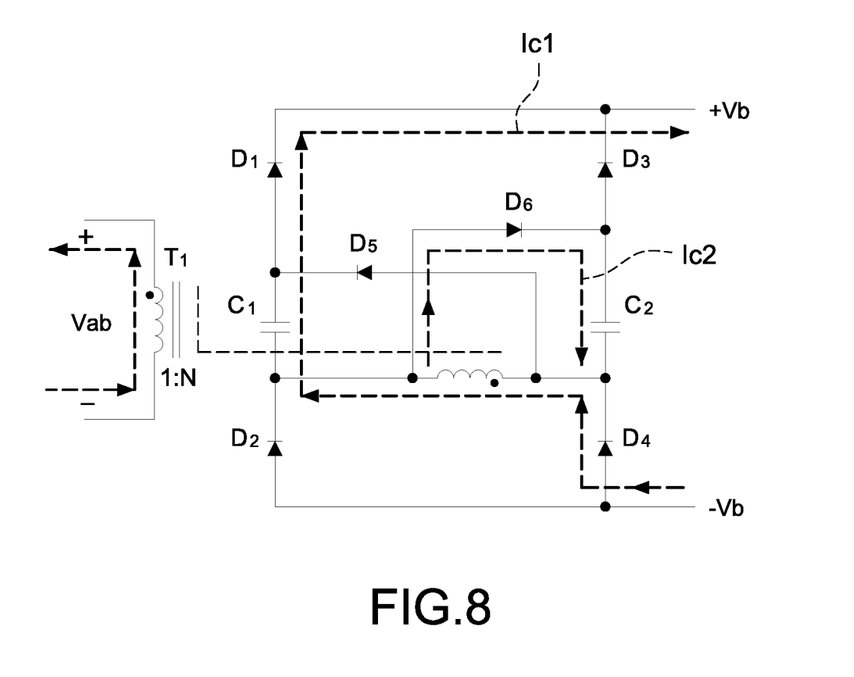
FIG. 8 is a schematic diagram of current paths of a third-quadrant operation in FIG. 5.

Please refer to FIG. 8, which shows a schematic diagram of current paths of a third-quadrant operation in FIG. 5. When the isolated converter operates in a third quadrant, a main current Ic1 flows through the secondary side of the transformer T1, the first capacitor C1, the first diode D1, the DC positive output node+Vb, the DC negative output node −Vb, the fourth diode D4, and the secondary side. A pre-charge current Ic2 flows through the secondary side of the transformer T1, the sixth diode D6, the second capacitor C2, and the secondary side. Similarly, when the isolated converter shown in FIG. 6 operates in a third quadrant (not shown), a main current flows through the secondary side of the transformer T1, the first diode D1, the DC positive output node+Vb, the DC negative output node −Vb, the fourth diode D4, the second capacitor C2, and the secondary side. A pre-charge current flows through the secondary side of the transformer T1, the first capacitor C1, the fifth diode D5, and the secondary side.

Figure 9:
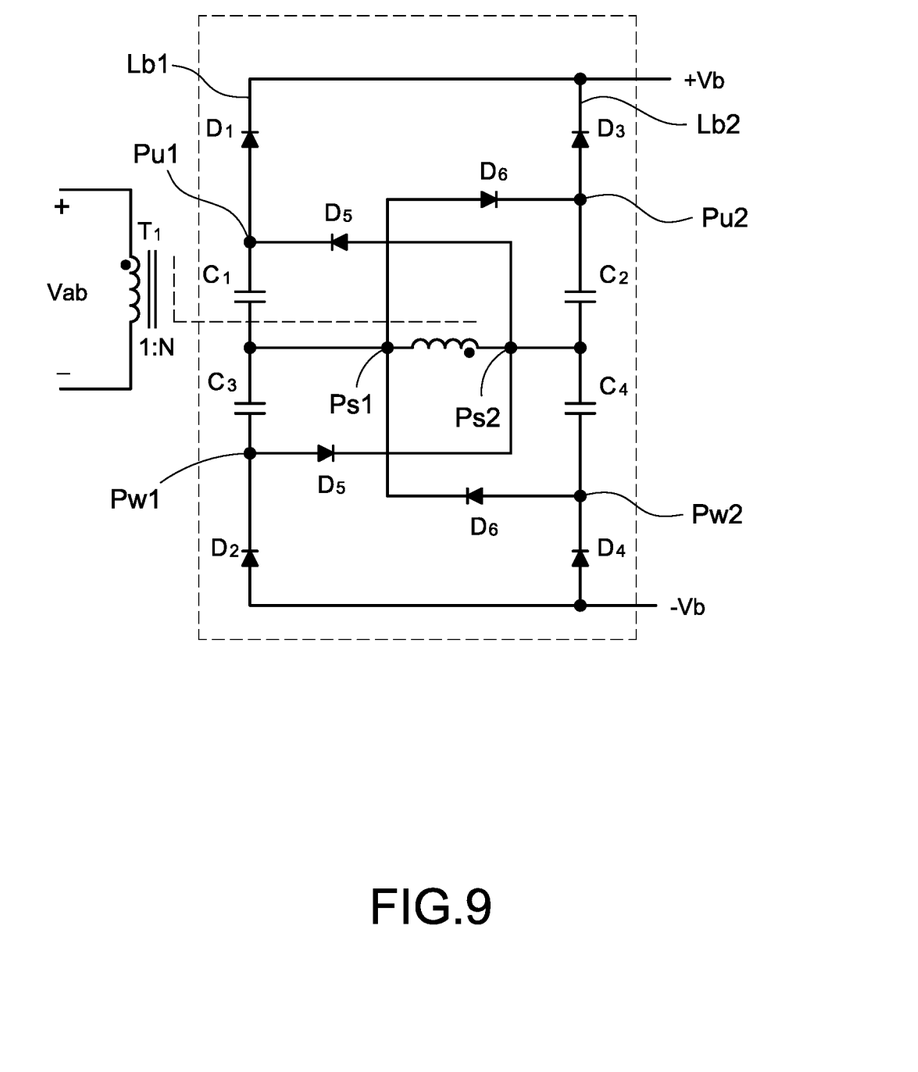
FIG. 9 is a single-bus circuit structure of the isolated converter with high boost ratio according to a third embodiment of the present disclosure.

Please refer to FIG. 9, which shows a single-bus circuit structure of the isolated converter with high boost ratio according to a third embodiment of the present disclosure, and the circuit structure of FIG. 9 is a combination of the circuit structure of FIG. 5 and the circuit structure of FIG. 6. As shown in FIG. 9, the number of the at least two capacitors is four, including a first capacitor C1, a second capacitor C2, a third capacitor C3, and a fourth capacitor C4. The number of the at least one fifth diode D5 is two, including an upper fifth diode D5 and a lower fifth diode D5. The number of the at least one sixth diode D6 is two, including an upper sixth diode D6 and a lower sixth diode D6.

Two ends of the first capacitor C1 are coupled to the secondary side first node Ps1 and the first bridge arm upper node Pu1. Two ends of the second capacitor C2 are coupled to the secondary side second node Ps2 and the second bridge arm upper node Pu2. Two ends of the third capacitor C3 are coupled to the secondary side first node Ps1 and the first bridge arm lower node Pw1. Two ends of the fourth capacitor C4 are coupled to the secondary side second node Ps2 and the second bridge arm lower node Pw2.

A cathode of the upper fifth diode D5 is coupled to the first bridge arm upper node Pu1, and an anode of the upper fifth diode D5 is coupled to the secondary side second node Ps2. A cathode of the upper sixth diode D6 is coupled to the second bridge arm upper node Pu2, and an anode of the upper sixth diode D6 is coupled to the secondary side first node Ps1. An anode of the lower fifth diode D5 is coupled to the first bridge arm lower node Pw1, and a cathode of the lower fifth diode D5 is coupled to the secondary side second node Ps2. An anode of the lower sixth diode D6 is coupled to the second bridge arm lower node Pw2, and a cathode of the lower sixth diode D6 is coupled to the secondary side first node Ps1.

In the circuit structure shown in FIG. 9, when the isolated converter operates in a first quadrant (not shown), a main current flows through the secondary side of the transformer T1, the second capacitor C2, the third diode D3, the DC positive output node+Vb, the DC negative output node −Vb, the second diode D2, the third capacitor C3, and the secondary side. A first pre-charge current flows through the secondary side, the upper fifth diode D5, the first capacitor C1, and the secondary side. A second pre-charge current flows through the secondary side, the fourth capacitor C4, the lower sixth diode D6, and the secondary side. When the isolated converter operates in a third quadrant (not shown), a main current flows through the secondary side, the first capacitor C1, the first diode D1, the DC positive output node+Vb, the DC negative output node −Vb, the fourth diode D4, the fourth capacitor C4, and the secondary side. A first pre-charge current flows through the secondary side, the upper sixth diode D6, the second capacitor C2, and the secondary side. A second pre-charge current flows through the secondary side, the third capacitor C3, the lower fifth diode D5, and the secondary side.

Figure 10:
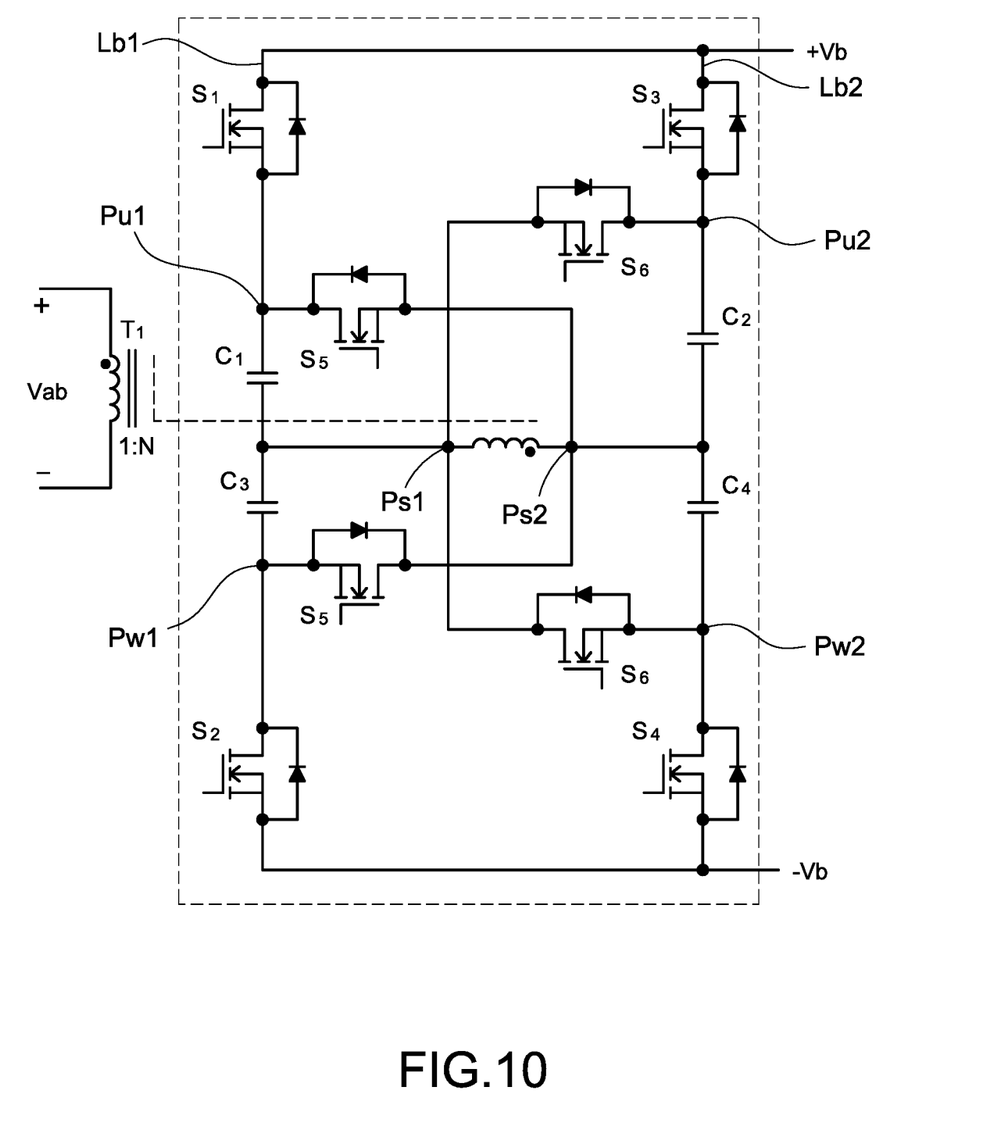
FIG. 10 is a single-bus circuit structure of the isolated converter with high boost ratio according to a fourth embodiment of the present disclosure.

Please refer to FIG. 10, which shows a single-bus circuit structure of the isolated converter with high boost ratio according to a fourth embodiment of the present disclosure. The main difference between FIG. 10 and FIG. 9 is that all the diodes D1-D6 in FIG. 9 are replaced by power switches S1-S6. In this embodiment, the power switches S1-S6 are, for example but not limited to, metal-oxide-semiconductor field-effect transistors (MOSFETs). By actively controlling the power switches S1-S6, the isolated converter can achieve the function of bidirectional operation. Similarly, the diodes in the isolated converters shown in FIG. 5, FIG. 6, and FIG. 9 also can be replaced by power switches so that the isolated converter can achieve the function of bidirectional operation and achieve less conduction loss. In FIG. 5, FIG. 6, and FIG. 9, the "diode" is not limited to a diode that is independently packaged, it can be also a parasitic element of the power switch, such as a body diode of the MOSFET.

Figure 11:
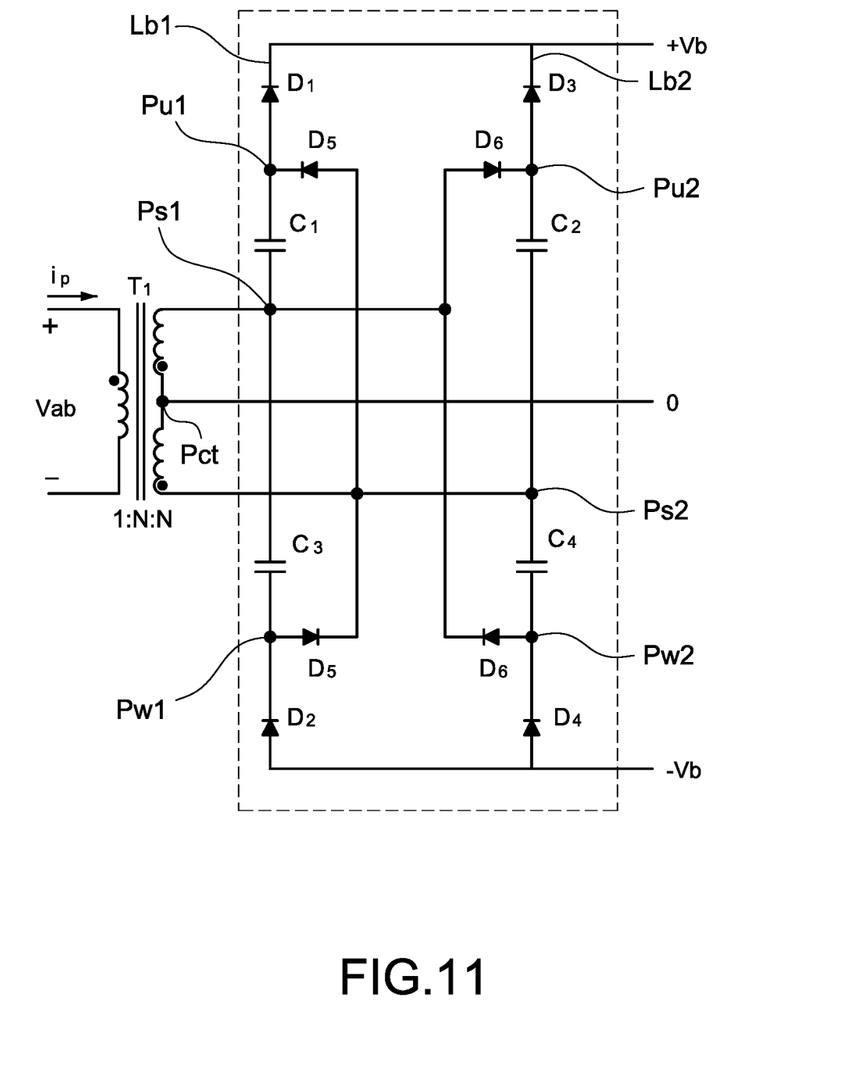
FIG. 11 is a dual-bus circuit structure of the isolated converter with high boost ratio according to the present disclosure.

Please refer to FIG. 11, which shows a dual-bus circuit structure of the isolated converter with high boost ratio according to the present disclosure. In the same concept of the diode-capacitor circuit, the dual-bus circuit structure is proposed for the specific application, such as a dual-bus output of the UPS's power converter. In comparison with the single-bus circuit structure of the isolated converter with high boost ratio shown in FIG. 9, the dual-bus circuit structure of the isolated converter with high boost ratio shown in FIG. 11 further includes a center-tapped node Pct. Therefore, balance charging and discharging operation of the dual-bus output voltage can be implemented through the center-tapped structure, and the circuit is similar to FIG. 9 and will not be repeated here.

Figure 12:
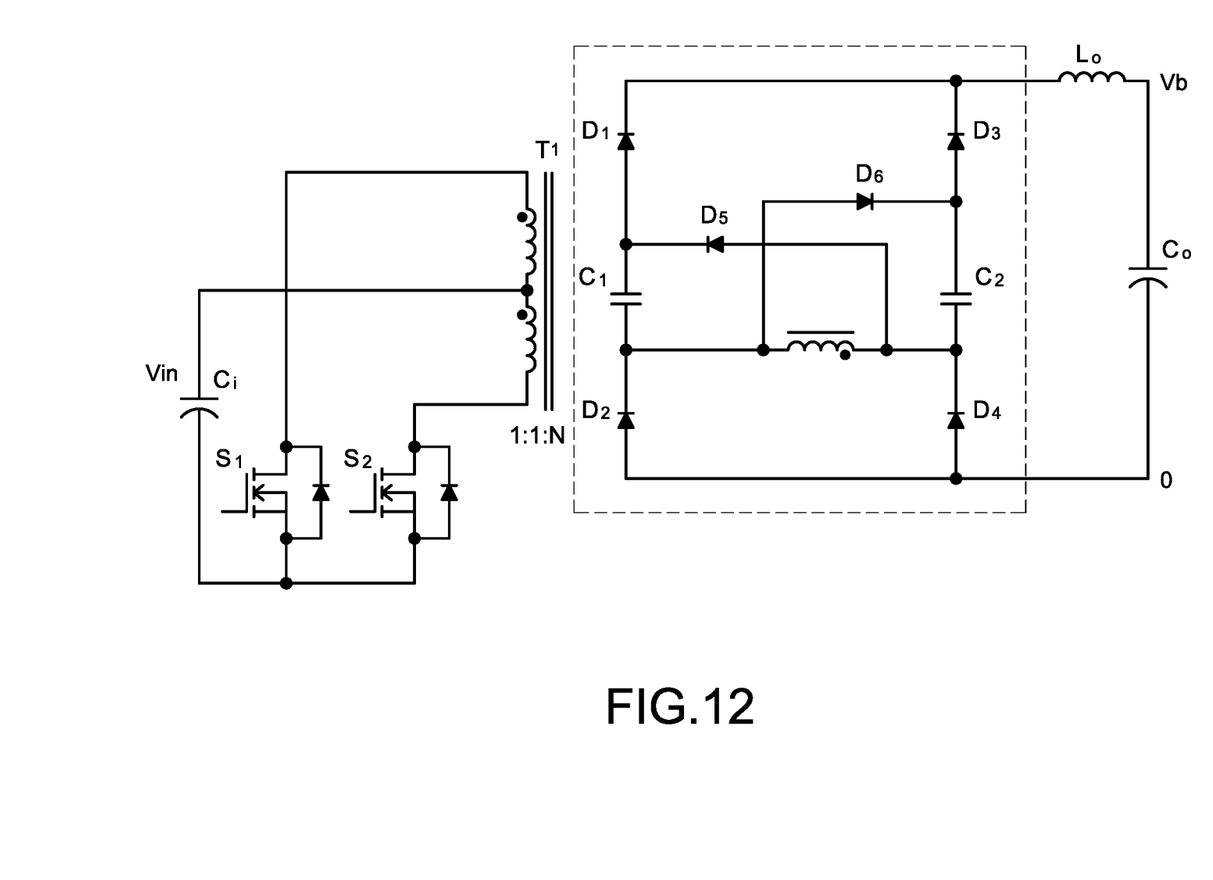
FIG. 12 is a circuit diagram of a push-pull converter having the single-bus circuit structure in FIG. 5.

Please refer to FIG. 12, which shows a circuit diagram of a push-pull converter having the single-bus circuit structure in FIG. 5. The diode-capacitor circuit shown in FIG. 5 is applied to the push-pull converter having the single-bus circuit structure to achieve the DC-to-DC converter with high boost ratio and high efficiency. Moreover, it can be controlled by a fixed frequency control manner.

In addition, the diode-capacitor circuit shown in FIG. 6, FIG. 9, and FIG. 10 is also suitable for the push-pull converter (its detailed circuit diagram is not shown) having the single-bus circuit.

Figure 13:
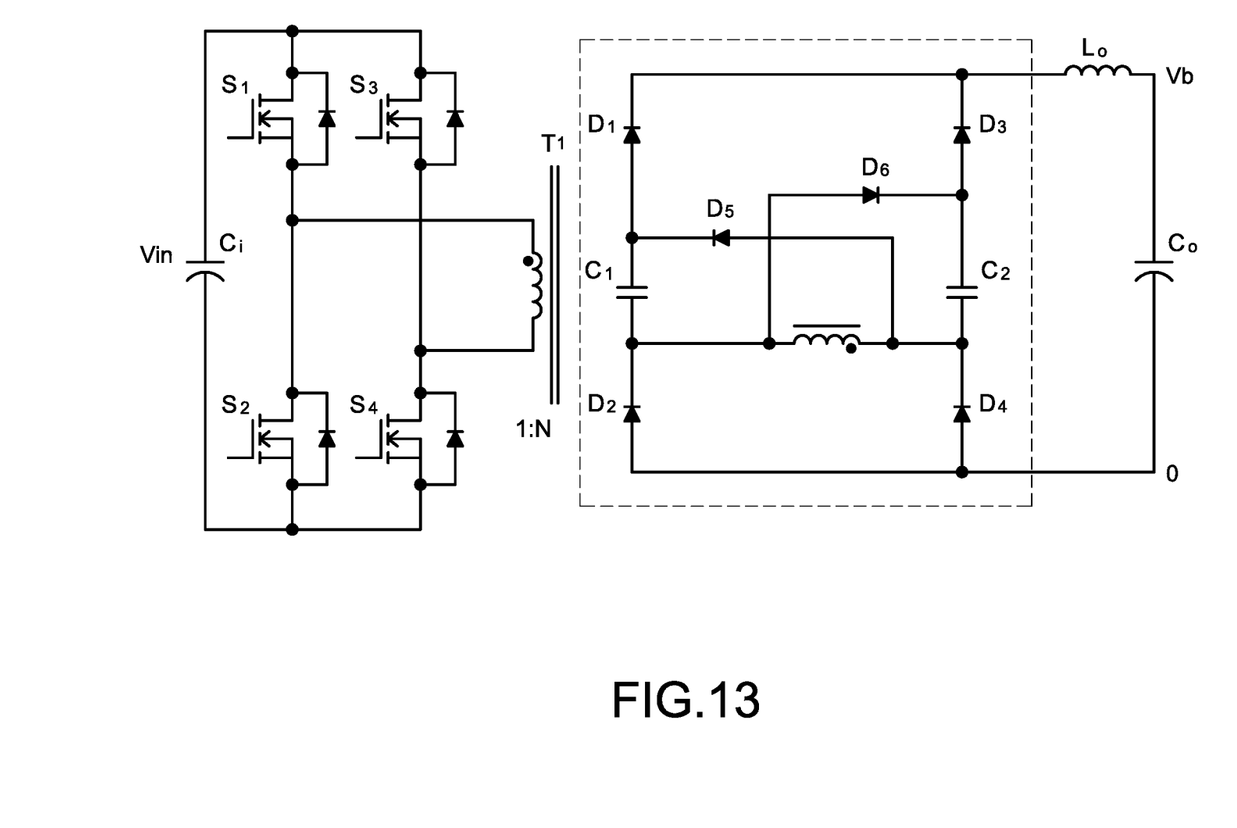
FIG. 13 is a circuit diagram of a full-bridge converter having the single-bus circuit structure in FIG. 5.

Please refer to FIG. 13, which shows a circuit diagram of a full-bridge converter having the single-bus circuit structure in FIG. 5. The diode-capacitor circuit shown in FIG. 5 is applied to the full-bridge converter having the single-bus circuit structure to achieve the DC-to-DC converter with high boost ratio and high efficiency.

In addition, the diode-capacitor circuit shown in FIG. 6, FIG. 9, and FIG. 10 is also suitable for the full-bridge converter (its detailed circuit diagram is not shown) having the single-bus circuit.

Figure 14:
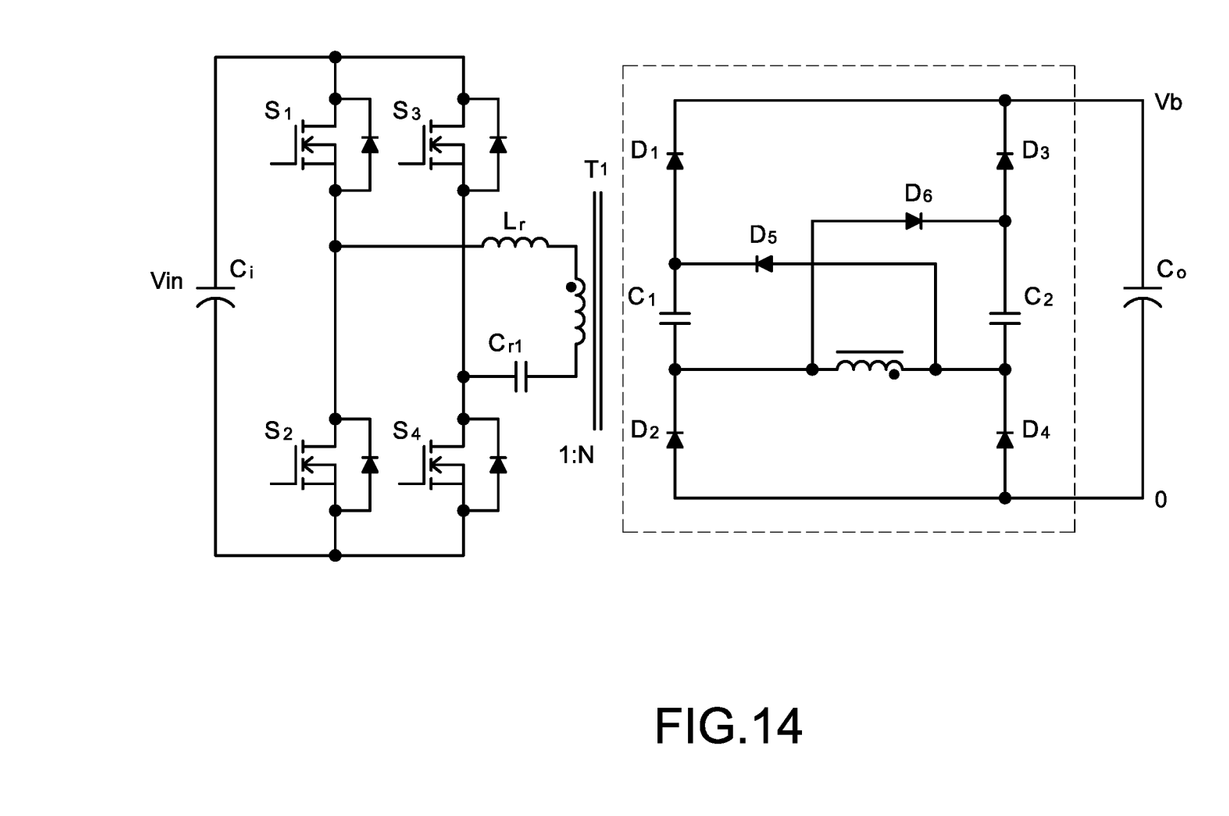
FIG. 14 is a circuit diagram of a full-bridge LLC resonant converter having the single-bus circuit structure in FIG. 5.

Please refer to FIG. 14, which shows a circuit diagram of a full-bridge LLC resonant converter having the single-bus circuit structure in FIG. 5. The diode-capacitor circuit shown in FIG. 5 is applied to the full-bridge LLC resonant converter having the single-bus circuit structure to achieve the DC-to-DC converter with high boost ratio and high efficiency.

In addition, the diode-capacitor circuit shown in FIG. 6, FIG. 9, and FIG. 10 is also suitable for the full-bridge LLC resonant converter (its detailed circuit diagram is not shown) having the single-bus circuit.

Figure 15:
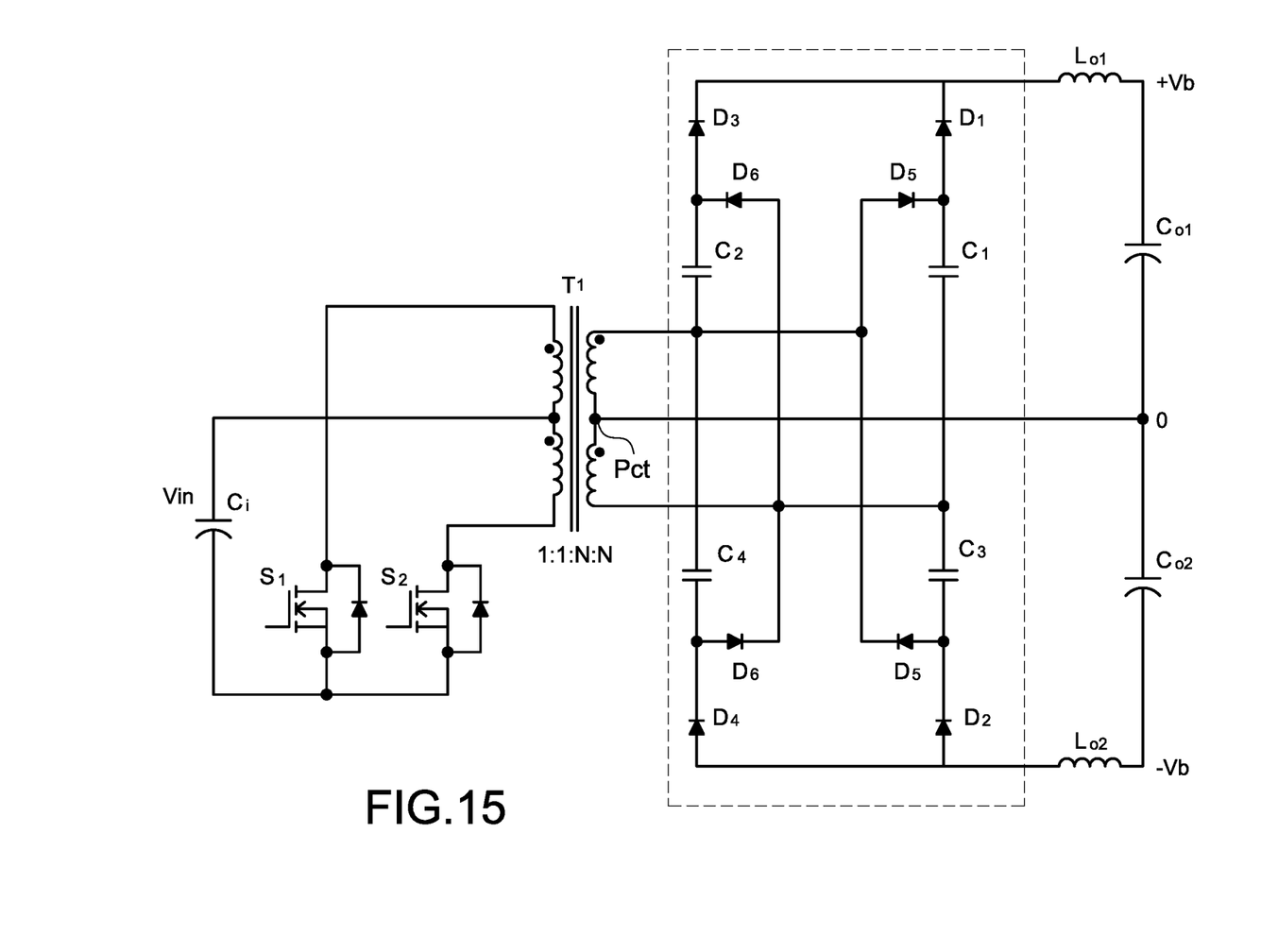
FIG. 15 is a circuit diagram of a push-pull converter having the dual-bus circuit structure in FIG. 11.

Please refer to FIG. 15, which shows a circuit diagram of a push-pull converter having the dual-bus circuit structure in FIG. 11. The diode-capacitor circuit shown in FIG. 11 is applied to the push-pull converter having the dual-bus circuit structure to achieve the DC-to-DC converter with high boost ratio and high efficiency.

Figure 16:
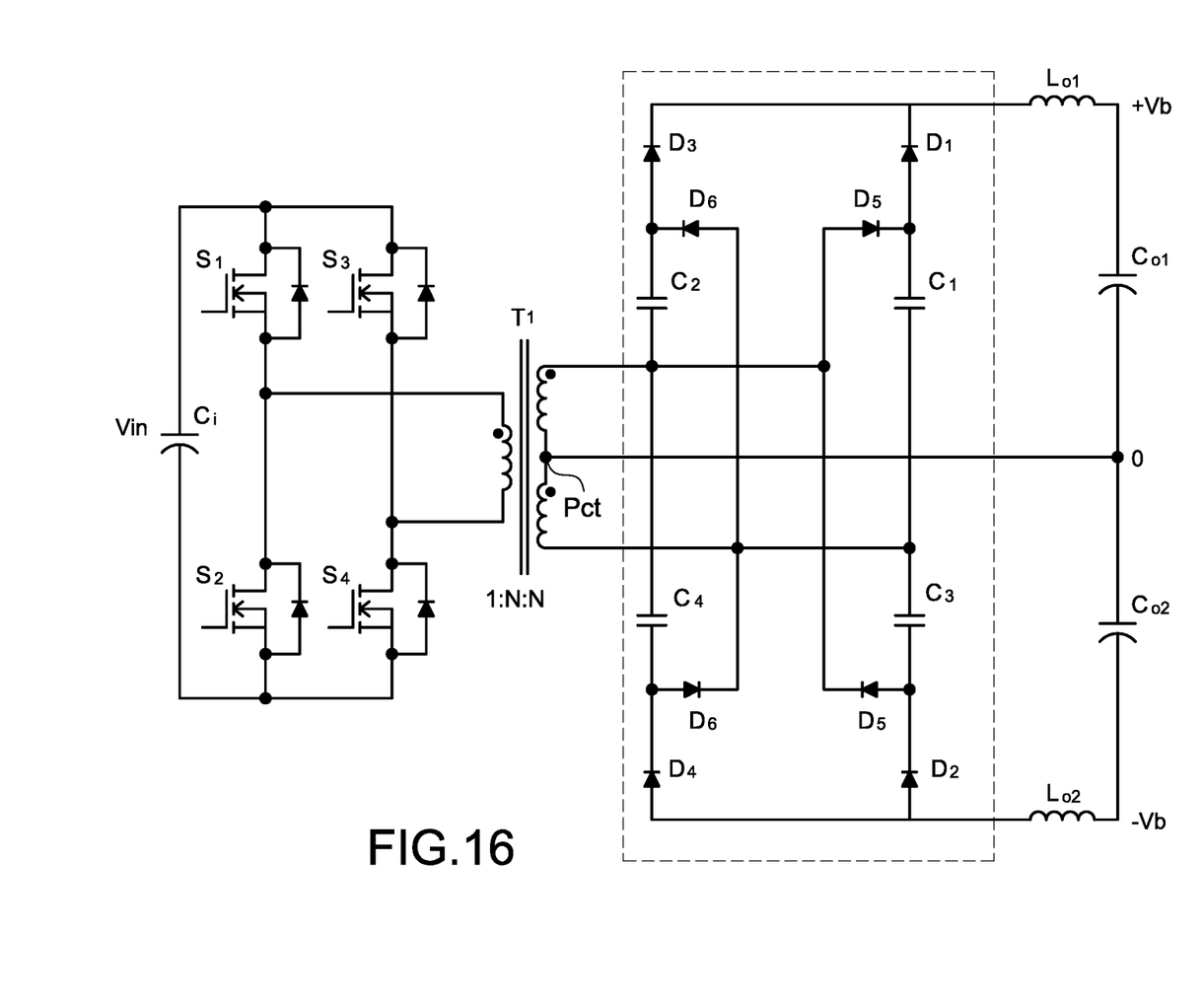
FIG. 16 is a circuit diagram of a full-bridge converter having the dual-bus circuit structure in FIG. 11.

Please refer to FIG. 16, which shows a circuit diagram of a full-bridge converter having the dual-bus circuit structure in FIG. 11. The diode-capacitor circuit shown in FIG. 11 is applied to the full-bridge converter having the dual-bus circuit structure to achieve the DC-to-DC converter with high boost ratio and high efficiency.

Figure 17:
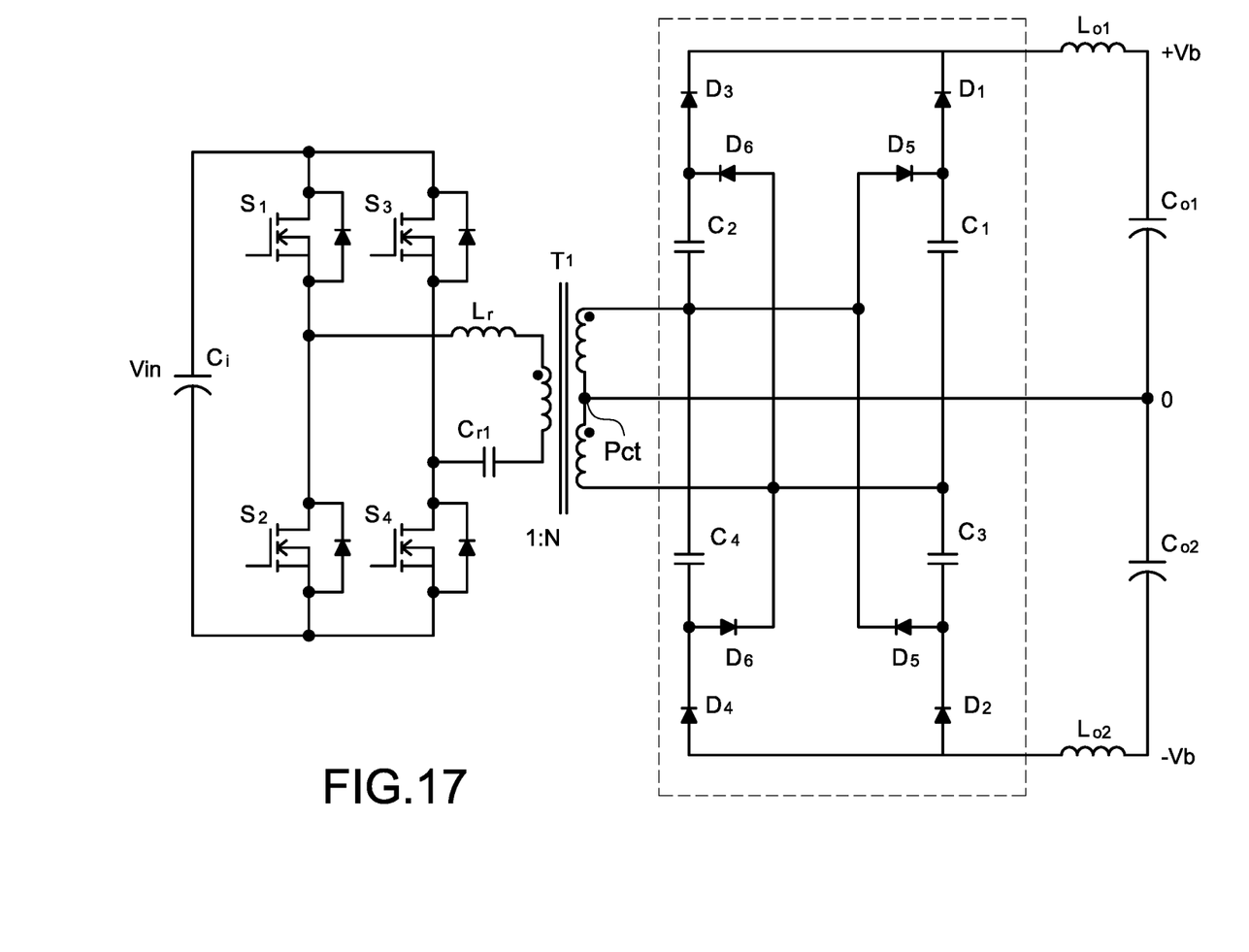
FIG. 17 is a circuit diagram of a full-bridge LLC resonant converter having the dual-bus circuit structure in FIG. 11.

Please refer to FIG. 17, which shows a circuit diagram of a full-bridge LLC resonant converter having the dual-bus circuit structure in FIG. 11. The diode-capacitor circuit shown in FIG. 11 is applied to the full-bridge LLC resonant converter having the dual-bus circuit structure to achieve the DC-to-DC converter with high boost ratio and high efficiency.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An isolated converter with high boost ratio consisting of:
   a transformer comprising a secondary-side coil having a first node and a second node,
   a first bridge arm having a first switch, a first capacitor, and a second switch connected in series,
   a second bridge arm connected to the first bridge arm in parallel, and the second bridge arm having a third switch, a second capacitor, and a fourth switch connected in series,
   a fifth switch, wherein a first end of the fifth switch is directly connected to the first switch and the first capacitor, and a second end of the fifth switch is directly connected to the second node of the secondary-side coil and directly connected to the secondary capacitor and the fourth switch so that the secondary-side coil, the fifth switch, and the first capacitor form a second current path, and
   a sixth switch, wherein a first end of the sixth switch is directly connected to the third switch and the second capacitor, and a second end of the sixth switch is directly connected to the first node of the secondary-side coil and directly connected to the first capacitor and the second switch so that the secondary-side coil, the sixth switch, and the second capacitor form a first current path.

2. The isolated converter with high boost ratio in claim 1, wherein the first switch is a first diode, the second switch is a second diode, the third switch is a third diode, the fourth switch is a fourth diode, the fifth switch is a fifth diode, and the sixth switch is a sixth diode.

3. The isolated converter with high boost ratio in claim 2, wherein
   an anode of the first diode and the first capacitor are connected at a first upper node,
   a cathode of the second diode and the first capacitor are connected at a first lower node,
   an anode of the third diode and the second capacitor are connected at a second upper node,
   a cathode of the fourth diode and the second capacitor are connected at a second lower node,
   a cathode of the first diode is connected to a cathode of the third diode,
   an anode of the second diode is connected to an anode of the fourth diode,
   an anode of the fifth diode is connected to the second node and the second lower node, and a cathode of the fifth diode is connected to the first upper node, and
   an anode of the sixth diode is connected to the first node and the first lower node, and a cathode of the sixth diode is connected to the second upper node.

4. The isolated converter with high boost ratio in claim 1, wherein the first switch is a first active switch, the second switch is a second active switch, the third switch is a third active switch, the fourth switch is a fourth active switch, the fifth switch is a fifth active switch, and the sixth switch is a sixth active switch.

5. The isolated converter with high boost ratio in claim 4, wherein
   a first non-controlled end of the first active switch and the first capacitor are connected at a first upper node,
   a first non-controlled end of the third active switch and the second capacitor are connected at a second upper node,
   a second non-controlled end of the first active switch is connected to a second non-controlled end of the third active switch, a first non-controlled end of the second active switch is connected to a first non-controlled end of the fourth active switch, a second non-controlled end of the second active switch and the first capacitor are connected at a first lower node, a second non-controlled end of the fourth active switch and the second capacitor are connected at a second lower node, a first non-controlled end of the fifth active switch is connected to the second node and the second lower node, and a second non-controlled end of the fifth active switch is connected to the first upper node, and a first non-controlled end of the sixth active switch is connected to the first node and the first lower node, and a second non-controlled end of the sixth active switch is connected to the second upper node.

* * * * *